I. A. GORDEN.
NUT LOCK.
APPLICATION FILED JUNE 6, 1917. RENEWED DEC. 11, 1918.

1,293,755.                              Patented Feb. 11, 1919.

WITNESSES
W. C. Fielding
J. O'Connell

INVENTOR
Isom A. Gorden
BY Richard Owen
ATTORNEY

UNITED STATES PATENT OFFICE.

ISOM A. GORDEN, OF BLUE MOUND, ILLINOIS.

NUT-LOCK.

1,293,755.  Specification of Letters Patent.  Patented Feb. 11, 1919.

Application filed June 6, 1917, Serial No. 173,185. Renewed December 11, 1918. Serial No. 266,308.

*To all whom it may concern:*

Be it known that I, ISOM A. GORDEN, a citizen of the United States, residing at Blue Mound, in the county of Macon and State of Illinois, have invented certain new and useful Improvements in Nut-Locks, of which the following is a specification.

This invention relates to nut locks and the primary object of the invention is to provide means for locking a nut against accidental reverse rotation when once threaded into position on a bolt, said means consisting of a nonrotatable washer adapted to be placed on the bolt previous to the positioning of the nut and carrying a locking member adapted to automatically engage the nut when the latter has been jammed against the washer.

Another object of the invention is to provide a nut lock of the type mentioned including a nut having a serrated collar or projection adapted to coöperate with a pawl carried by the nonrotatable washer.

Figure 1:
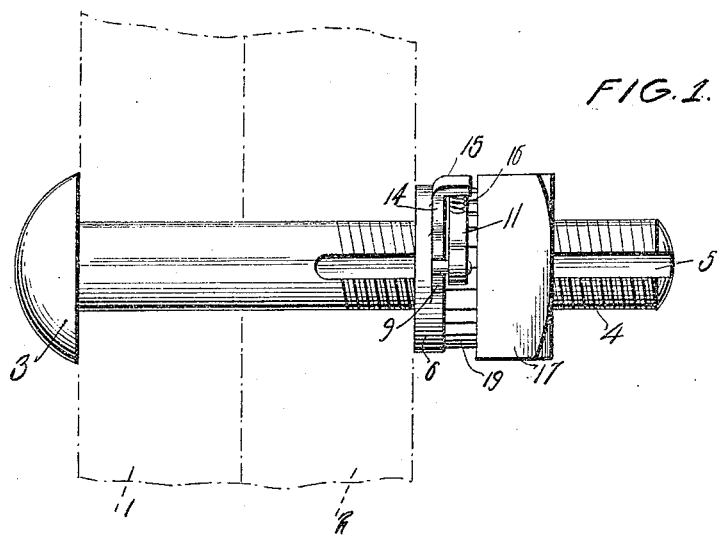

The above and other objects and advantages of this invention will be in part described and in part understood from the following description of the present preferred embodiment, the same being illustrated in the accompanying drawings in which, Figure 1 is a side elevation of my improved nut lock.

Figure 2:
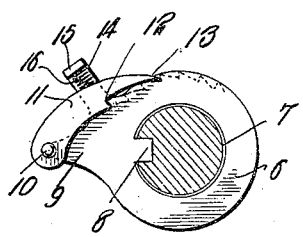
Figure 3:
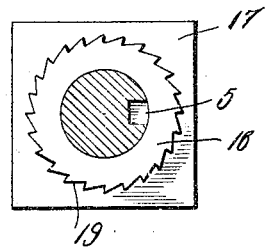

Fig. 2 is a sectional view of the bolt showing the application of a lock washer, and Fig. 3 is a sectional view of the bolt showing the construction of the nut engaged therewith.

In the drawings illustrating the preferred embodiment of my invention, I have shown a pair of plates 1 and 2 held together by means of a bolt 3 passing through the same. The bolt 3 is provided with the usual screw threads 4 and has a longitudinal groove 5 extending the full length of the threaded portion thereof. Received on the bolt and engaging the plate 2 is a lock washer 6. The washer 6 is provided with a central bolt receiving opening 7, and projecting into said opening from one edge thereof is a tongue 8 which is received in the groove 5 and holds the washer against rotation. Formed integral with the washer and extending outwardly from the periphery thereof is an arm 9 carrying a pintle 10, to which is pivotally secured one end of a pawl 11. The opposite end of the pawl is reduced to provide a shoulder 12 and a pointed end 13, and is movably supported on a second outwardly standing arm 14. The arm 14 is also formed integral with the periphery of the washer and diverges slightly from the arm 9, terminating in an upturned end 15. Supported on the arm 14 is a coiled compression spring 16 which has one terminal engaging the upturned end 15 and the other terminal engaging the pawl 11 and normally urges the pawl in the direction of the bolt. A nut is indicated at 17 and is provided on its under surface with a reduced annular projection or collar 18 having ratchet teeth 19 extending around the periphery thereof. As shown in Fig. 1, the nut 19 is threaded on the bolt until the collar 20 is jammed against the washer 6 and in this position the pawl 11 engages the ratchet teeth 19 to prevent reverse rotation of the nut.

It will be seen that the spring 16 normally holds the pawl against the tooth portion of the nut but when it is desired to release the nut, it is only necessary to insert the point of a nail or other implement between the pawl and the tooth portion of the nut and to press the same against the pawl forcing it outwardly against the tension of the spring and leaving the nut free to be reversely rotated.

In the present drawings and description I have shown and described only the preferred embodiment of the invention but it is to be understood that I reserve the right to make such changes as are desirable and come within the scope of the appended claims without departing from the spirit of the invention.

I claim:—

1. A nut lock, including a bolt provided with a longitudinal groove, a washer received on said bolt and having a tongue adapted to be received in said groove, an outwardly extending arm formed on the periphery of said washer, a pintle provided on said arm, a pawl pivotally connected to said pintle, a second arm extending outwardly from said washer, an upturned end formed on said second arm, a coiled spring positioned on said second arm and having one terminal engaging said upturned end and the opposite terminal engaging said pawl, a nut threaded on said pawl, a reduced annular projection formed on the under sides of said nut and adapted to engage said washer, and ratchet teeth formed on the periphery of said projection for engagement with said pawl.

2. A nut lock, including a bolt, a nut threaded thereon and provided with ratchet teeth, a washer received on said bolt, an arm extending from the periphery of said washer, a pawl pivotally secured to said arm, a second arm extending from said washer and supporting said pawl, and a spring carried by said second arm and engaging said pawl to force the same against the teeth formed on the nut.

3. A nut lock, including a bolt, a stationary washer received on said bolt, spaced arms extending outwardly from the periphery of said washer, a pivoted pawl carried by one of said arms, a movable support upon the other arm, a nut threaded on said bolt and teeth formed on said nut for engagement with said pawl.

In testimony whereof I affix my signature in presence of two witnesses.

ISOM A. GORDEN.

Witnesses:
E. E. CHEWNING,
H. W. BELKNAP.

Copies of this patent may be obtained for five cents each, by addressing the "Commissioner of Patents, Washington, D. C."